J. R. BAILEY.
Spring-Bed Attachments.
No. 149,369. Patented April 7, 1874.
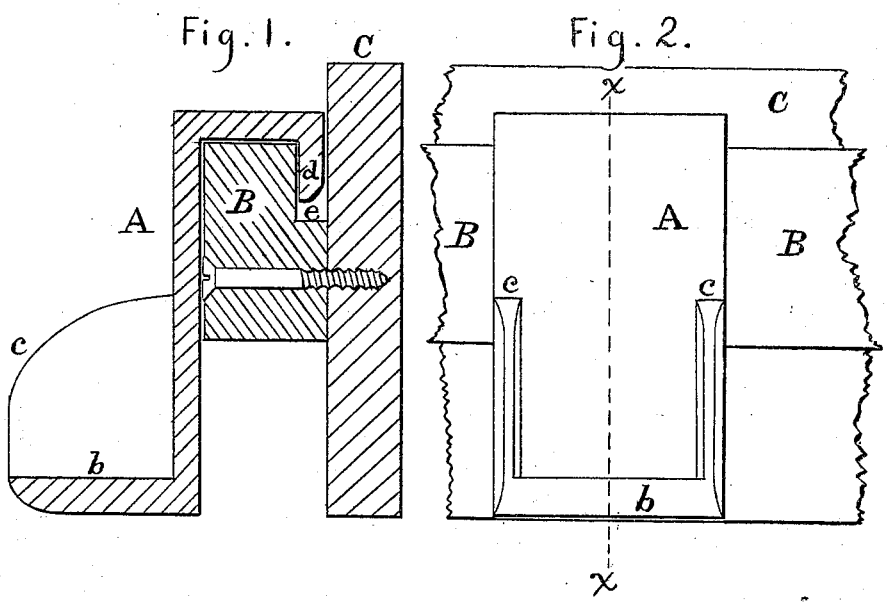
Witnesses.
C. C. Archer
H. A. Daniels
Inventor.
John R. Bailey
By W. Burris Atty.

UNITED STATES PATENT OFFICE.

JOHN R. BAILEY, OF CLINTON CITY, IOWA.

IMPROVEMENT IN SPRING-BED ATTACHMENTS.

Specification forming part of Letters Patent No. 149,369, dated April 7, 1874; application filed October 28, 1873.

*To all whom it may concern:*

Be it known that I, JOHN R. BAILEY, of Clinton City, in the county of Clinton and State of Iowa, have invented certain new and useful Improvements in Spring-Bed Attachment; and I do hereby declare the following to be a full, clear, and exact description of the invention, such as will enable others skilled in the art to which it pertains to make and use it, reference being had to the accompanying drawings, which form part of this specification, in which—

Figure 1 is a section of the supporter, cleat, and bed-rail, on line $x$ $x$ of Fig. 2. Fig. 2 is a front view of the supporter attached to the cleat.

My invention relates to that class of bed-bottom attachments which have a box at the bottom to receive the slats and a supporting-hook at the top; and consists in the combination of a supporter thus made with a rabbeted or grooved cleat attached to the bed-rail.

A represents the supporter, having bottom $b$ and sides $c$ $c$ and hook $d$, arranged to drop into a rabbet, $e$, in the cleat B, attached to the bed-rail C.

These supporters may be made of different lengths to suit bed-bottoms of different thicknesses, so that the bed will not extend up too high above the rails, and the bottoms $b$ are made sufficiently wide to allow for some variation in the widths of different bed-bottoms.

What I claim, and desire to secure by Letters Patent, in bed-bottoms, is—

The supporter A, having bottom $b$, sides $c$ $c$, and hook $d$, in combination with cleat B, having rabbet $e$, attached to the bed-rail C, substantially as described and shown.

In testimony that I claim the foregoing I have hereunto set my hand.

JOHN R. BAILEY.

Witnesses:
WM. W. SANBORN,
J. H. FLINT.